(12) United States Patent
Krimm et al.

(10) Patent No.: US 7,341,394 B2
(45) Date of Patent: Mar. 11, 2008

(54) GEAR SHIFT MECHANISM GATE PLATE ASSEMBLY AND METHOD FOR PRODUCING SAME

(75) Inventors: Erik Krimm, Hamburg (DE); Michael Siemers, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 137 days.

(21) Appl. No.: 09/726,589

(22) Filed: Dec. 1, 2000

(65) Prior Publication Data

US 2001/0006719 A1    Jul. 5, 2001

(30) Foreign Application Priority Data

Dec. 1, 1999    (DE)    ............................... 199 57 776

(51) Int. Cl.
*F16H 61/22*    (2006.01)
(52) U.S. Cl. ............... 403/271; 403/265; 403/270; 403/278; 74/473.21
(58) Field of Classification Search ............ 403/278, 403/279, 280, 282, 265, 270, 271; 74/473.21; 192/3.63
See application file for complete search history.

(56) References Cited

U.S. PATENT DOCUMENTS 4,760,784 A * 8/1988 Whiteside ............ 100/220
4,783,103 A * 11/1988 Schlegel ............... 292/216
5,950,782 A    9/1999 Brauns et al. .......... 192/3.63
6,182,527 B1 * 2/2001 Sander ............... 74/473.21 X
6,297,961 B1 * 10/2001 Koizumi et al. ............ 361/720

FOREIGN PATENT DOCUMENTS

DE    196 41 706    3/1998
DE    198 32 868 A1 *    2/2000

* cited by examiner

*Primary Examiner*—Daniel P. Stodola
*Assistant Examiner*—Ernesto Garcia
(74) *Attorney, Agent, or Firm*—Crowell & Moring LLP

(57) ABSTRACT

A plate-like functional component and method of making same, in particular a gate plate of an automatic gear shift mechanism with locking gate is provided. The gate plate includes engagement holes for engagement elements which kinetically interact with the functional component. To allow high mechanical forces to be transmitted using this component while simplifying its production, and to as far as possible avoid impact noises during interaction with engagement elements which are guided inside the holes, it is provided that the functional component comprises, in sandwich form, three stamped parts, which bear flat against one another, and are unreleasably connected to one another. Each stamped part has at least two engagement holes for engagement elements which kinetically interact with the functional component. The engagement holes in the stamped parts are arranged congruently with respect to one another. At least one of these holes, in the middle stamped part, has a hole wall which is provided with an elastomeric plastic cover.

3 Claims, 1 Drawing Sheet

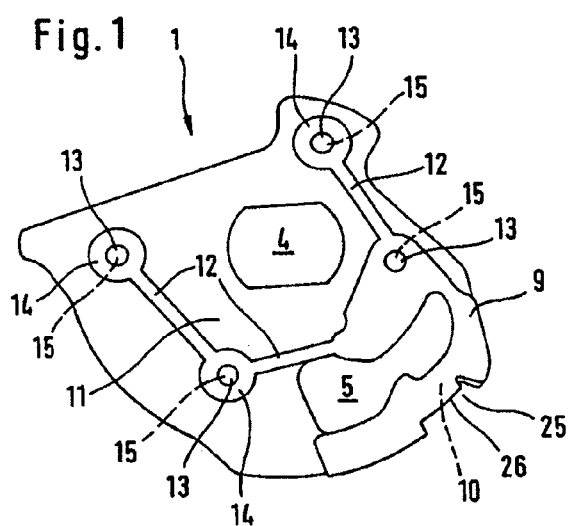
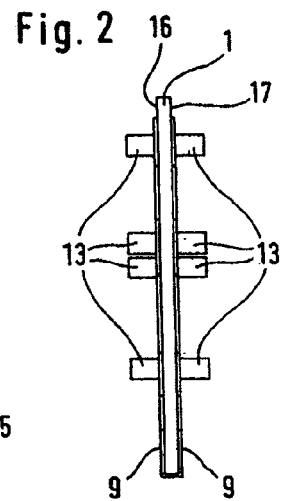
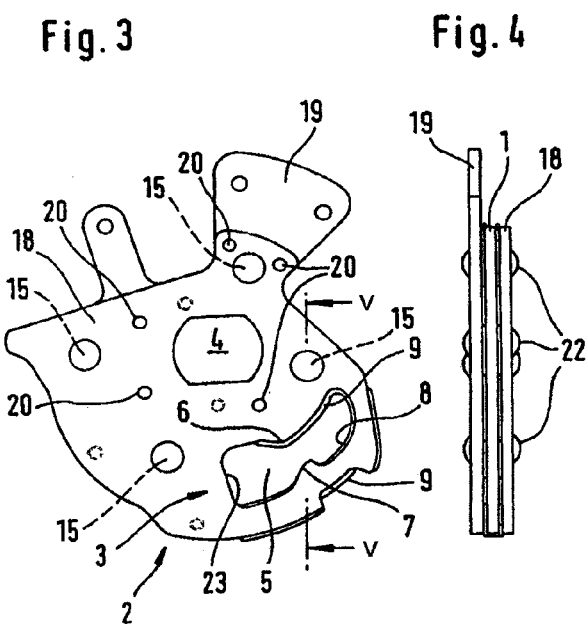
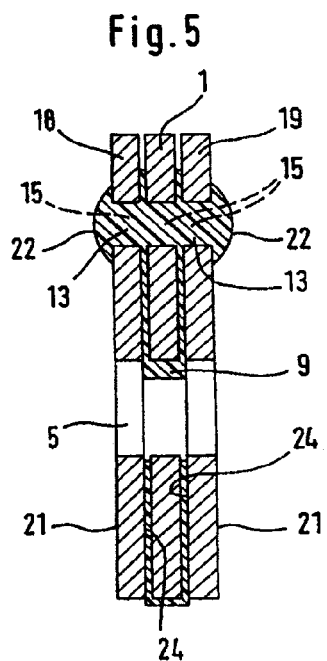

GEAR SHIFT MECHANISM GATE PLATE ASSEMBLY AND METHOD FOR PRODUCING SAME

BACKGROUND AND SUMMARY OF THE INVENTION

This application claims the priority of German Patent Document 199 57 776.5, filed in Germany Dec. 1, 1999, the disclosure of which is expressly incorporated by reference herein.

The invention relates to a functional component and method of making same. Preferred embodiments of the invention relate to functional components in the form of gate plates for automatic gear shift mechanisms with a locking gate, including engagement holes for engagement elements interacting kinetically with the functional component.

A functional component of the generic type is known from DE 196 41 706 C1 (corresponding U.S. Pat. No. 5,950,782), which describes an arrangement for locking a selection device, which is used for an automatically shifting gear shift mechanism, of a motor vehicle, the arrangement including a gate plate having two engagement holes. One engagement hole serves to receive a selection shaft, which forms an engagement element and, in that arrangement, is connected, securely in terms of movement for force transmission, to the gate plate, on the one hand, and to a manual selection lever, on the other hand. The second engagement hole serves as a gate slot of a locking gate, in which a projection of a lever arm of a differential lever used as locking actuator engages, thus forming a further engagement element. To enable the high forces to be transmitted without damage, the curved gate plate is, however, designed to be relatively thick and therefore heavy, with the result that the fine, filigree functional contours of the gate plate can only be produced precisely and reproducibly within a tight space in a very complex way. When the differential lever is actuated, its projection, which is guided in the slot, strikes against the gate slot walls, depending on the direction of actuation, which on the one hand causes disruptive impact noises and on the other hand, on account of the hard impact, causes wear to the projection and the walls of the slot.

An object of the invention is to refine a functional component of the generic type, in particular a cam plate of an automatic gear shift mechanism with locking gate, in such a manner that it can be used to transmit high mechanical forces while being easier to produce and impact noises during interaction with engagement elements guided in the holes are as far as possible avoided. A further object is to provide a method for producing the functional component with reduced outlay.

This object is achieved according to preferred embodiments of the invention by providing a plate-like in the form of a gate plate of an automatic gear shift mechanism with locking gate, having engagement holes for engagement elements which kinetically interact with the functional component, wherein the functional component comprises, in sandwich form, at least three stamped parts, which bear flat against one another, are unreleasably connected to one another and each have at least two engagement holes for engagement elements which kinetically interact with the functional component, the engagement holes in the stamped parts being arranged congruently with respect to one another, at least one of these holes, in a middle stamped part, having a hole wall which is provided with an elastomeric plastic cover.

This object is also achieved according to embodiments of the invention by providing a method of making such a functional component, including:

- stamping three smaller individual metal sheets out of a larger metal sheet, each individual metal sheet having at least two engagement holes for engagement elements which kinetically interact with the functional component,
- placing the individual metal sheets against one another in a sandwich structure with corresponding engagement holes in each of the individual stamped metal sheets congruent with one another,
- providing a hole wall of at least one of the engagement holes in the middle stamped part with an elastomeric plastic cover, before the individual sheets are placed against one another, and
- non-detachably connecting the three individual metal sheets together after they have been placed against one another.

The sandwich structure of the invention allows precisely reproducible production of precision functional contours of the functional component with relatively little outlay, whereas the rigidity for the transmission of high forces remains ensured. This is assisted by the provision of a plurality of relatively thin-walled individual parts for the component, which can be machined considerably more easily compared to the known single, thick-walled component. In this case, it is advantageous to use the stamping process, which is readily manageable and can also be used to produce the individual parts themselves at considerably lower outlay compared to the single-piece component. The elastomeric plastic cover for at least the hole wall of one of the two engagement holes provides a substantially soft and therefore noiseless resilient abutment for the engagement element, so that there are no disruptive impact noises which cause wear. Overall, the use of stamped parts which can be produced with little outlay and are easy to connect to form a functional component, as well as the noise damping which can be achieved with the simple means of an elastomeric plastic cover results in a production process for the functional component which is easy to execute yet constitutes a reliable process.

Expedient configurations of the invention are described below and in the claims.

Other objects, advantages and novel features of the present invention will become apparent from the following detailed description of the invention when considered in conjunction with the accompanying drawings.

BRIEF DESCRIPTION OF THE DRAWINGS

FIG. 1 shows a front view of a middle stamped part of a functional component, constructed according to a preferred embodiment of the invention, with injection-moulded plastic around it;

FIG. 2 shows a side view of the stamped part from FIG. 1;

FIG. 3 shows a front view of the functional component according to the invention after assembly;

FIG. 4 shows a side view of the functional component from FIG. 3 after the plug-in domes have been deformed; and FIG. 5 shows a section on line I-I through the functional component shown in FIG. 3, shown after the plug-in domes have been deformed.

DETAILED DESCRIPTION OF THE DRAWINGS

FIG. 1 shows a middle stamped part 1 of a plate-like gate plate 2, which is formed as a sandwich structure and represents a functional component, of an automatic gear shift mechanism with locking gate 3 in a motor vehicle. The middle stamped part 1 has two engagement holes 4 and 5, the engagement hole 4 being intended for the attachment of a selection shaft of the gear shift mechanism. The engagement hole 5 is designed as a gate slot having an upper guide contour 6 and a lower locking projection 7 for the reverse gear position, inside which slot a projection of a differential lever is guided. The selection shaft and the projection of the differential lever form the engagement elements which kinetically interact with the functional component.

In the region of the engagement hole 5, elastomeric plastic is injection-moulded around the stamped part 1, the entire hole wall 8, apart from a left-hand wall section 23, being provided with a softly resilient plastic cover 9 which projects slightly into the engagement hole 5 and for holding reasons substantially encloses the surrounding hole edge 10.

Beneath the locking projection 7, the hole edge 10 has an indentation 25 which is provided with a locking contour 26 for the parked position. Flat connecting webs 12, which run in the form of tracks along the base surfaces 11 on both sides of the middle stamped part 1 and consist of the injection-moulding compound, run from the upper part of the hole edge 10, plug-in domes 13, which project from the base surfaces 11, being formed out of the connecting webs at certain points (FIG. 2). At these points, the connecting webs 12 are concentrically widened and form a ring 14 around the corresponding dome 13. Passage holes 15 are formed in the middle stamped part 1 at the location of the plug-in domes 13, with the result that the domes 13 belonging to the two sides 16 and 17 of the middle stamped part 1 are integrally connected to one another as a result of the injection-moulding step, during which the injection-moulding material penetrates through the passage holes 15. As a result, the connecting webs 12 and the domes 13 are held particularly securely on the stamped part 1. The domes 13 of both sides 16 and 17 are arranged congruently with respect to one another, although it is also contemplated according to other embodiments for the plug-in domes 13 on one side 16,17 to be connected to the connecting webs 12 on the other side 17,16. Furthermore, it is also contemplated according to other embodiments to form passage holes 15 without domes 13 being arranged thereon, so that also or even only the connecting webs 12 are integrally connected directly to one another.

To produce the gate plate 2, three smaller, individual metal sheets 1, 18 and 19, which are provided with all the functional outer contours required and the base surfaces 11 of which correspond to one another in terms of shape and dimensions, are punched out of one or more larger metal sheets, which may be formed from pieces of strip material or from billets. At the same time, for reasons of process economy, the two engagement holes 4 and 5 in each of the individual plates 1, 18, 19 are stamped out in the same position. The stamped parts 1, 18 and 19 produced in this way have precise internal and external contours, the high transmission of force by the engagement elements, which takes place via the engagement holes 4 and 5, requiring a stable design of the gate plate, and this condition, together with the demands imposed on a low weight, are simultaneously fulfilled by the sandwich structure. Then, the elastomeric plastic is—as described—injection-moulded around the middle stamped part 1, so as to form the plastic cover 9, the connecting webs 12 and the domes 13, the plug-in domes 13 belonging to one side 16 of the middle stamped part 1 being integrally connected to the plug-in domes 13 belonging to the other side 17 during the injection-moulding step via the passage holes 15 which are arranged at the same point. The injection moulding does not include the left-hand side section 23 of the wall of the engagement hole 5, since it is there that the locking pawl is positioned in a locking position and high (locking) forces have to be transmitted, which cannot be applied by the remainder of the hole wall 8, on account of the elastic resilience provided via the plastic cover 9. In this case, controlled injection moulding makes it possible for the first time to form undamped and adjacent damped regions accurately even within structural conditions which are not readily accessible by hand, so that the required functional properties, which are altogether different from one another on a local basis, of the accurate contour of the engagement hole 5 can be tailored according to requirements.

Then, the stamped parts 1, 18 and 19 are placed flat against one another in the form of a sandwich, with the corresponding engagement holes 4 and 5 in each of the stamped parts 1, 18 and 19 covering one another congruently (FIG. 3). The passage holes 15—including those provided at the location of the plug-in domes 13—are economically produced in the same way at the same time as the stamping of the three stamped parts 1, 18, 19, these passage holes being arranged congruently in all the stamped parts 1, 18, 19 and having dimensions which correspond to those of the plug-in domes 13. The passage holes 15 in the two outer stamped parts 18, 19 lie opposite the domes 13 belonging to the middle stamped part 1. Then, the outer stamped parts 18 and 19 are fitted onto the middle stamped part 1, the plug-in domes 13 of which are fitted into the passage holes 15 in the outer stamped parts 18 and 19. To ensure that the injection-moulding is not damaged as a result of compression, spacer lugs are pressed out of the middle stamped part 1 on both sides and/or spacer lugs 20 facing the middle stamped part 1 are pressed out of the outer stamped parts 18, 19, then projecting convexly on the inner sides 24 of the outer stamped parts 18, 19, after the sheet-metal parts 1, 18 and 19 have been stamped out and before the injection-moulding step. Because the spacer lugs 20 are formed from a material which is harder than the injection-moulding material, when the stamped parts 18, 19 are being pressed onto the stamped part 1, firstly, and then onto the selection shaft, secondly, this material cannot be completely displaced, and consequently the injection moulding is at most flattened. In addition, the design of the spacer lugs 20 prevents or at least limits axial tilting of the stamped parts 1, 18, 19 when forces are introduced via the locking contours.

In the plugged-together position reached, the plug-in domes 13, which project out of the passage holes 15 in the outer stamped parts 18 and 19, are partially melted at their free ends as a result of the application of thermal energy or irradiation, for example by microwave, infra red light or ultrasound, after which the ends are pressed onto the outer sides 21, which are remote from the middle stamped part 1, of the outer stamped parts 18 and 19, forming a flat, in this case mushroom-shaped, head 22 which is wider than the dimension of the passage holes 15 (FIGS. 4 and 5). The result is a connection between the individual stamped parts 1, 18 and 19 which is impossible to detach. The connecting webs 12, and in particular the rings 14, also have the advantageous function of movement- and noise-damping spacers if, when the gate plate 2 is operating, the stamped parts 1, 18, 19 move in the axial direction relative to one another.

Even if it is conceivable, within the context of the invention, for the plastic cover to be formed from plastic borders which have been clicked (elastically deformed and released to clamp into position) into place or have been secured in undercuts or cutouts of the middle stamped part and surround the hole edge, the exemplary embodiment described above—not least because of the absence of the individual parts which are otherwise required—represents a far less complex solution to the object which was described at the outset and on which the invention is based. This embodiment also makes additional labor-intensive and expensive connecting elements and techniques, such as riveting, soldering or welding, for the non-detachable connection of the stamped parts 1, 18, 19 superfluous. According to the above example, the damping structure—the plastic cover 9—and the connecting structure (plug-in domes 13) are formed in a simple manner by the injection-moulding as an integrally connected, multi-functional structural unit. Furthermore, the plug-in domes 13, which are flexible within the scope of their elasticity, allow better alignment of the individual stamped parts 1, 18, 19 on account of their rotatability with respect to the line of action of the force. Otherwise, the stresses between the stamped parts 1, 18, 19 become extremely high, which may cause the entire gate plate 2 to fail in operation as a result of cracking. Finally, the injection-moulding allows a virtually unlimited range of designs for the damped regions of the gate plate 2 to be achieved without particular difficulty.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A functional component as a gate plate of an automatic gear shift mechanism with a locking gate, having engagement holes for engagement elements which kinetically interact with the functional component, wherein the functional component comprises at least three stamped parts, which lie flat sandwiched against one another, are unreleasably connected to one another and each have at least two engagement holes for engagement elements which kinetically interact with the functional component, the engagement holes in the stamped parts being arranged congruently with respect to one another, at least one of said holes, in a middle one of the stamped parts, having a hole wall which is provided with an elastomeric plastic cover, wherein the plastic cover is formed by injection-moulding plastic around a hole edge, wherein connecting webs lead from the injection-moulded plastic around the hole edge, which said webs run on a base surface of the middle stamped part, are of the injection-moulded plastic and from which plug-in domes, which project from the base surface, are formed out at certain points on the webs, and wherein correspondingly dimensioned passage holes, into which the plug-in domes are fitted, are formed on the two outer stamped parts, congruently with respect to the plug-in domes.

2. Functional component according to claim 1, wherein the passage holes at the location of the plug-in domes are also formed on the middle stamped part, and wherein the plug-in domes or the connecting webs belonging to one side of the middle stamped part are joined integrally to the plug-in domes or the connecting webs belonging to the other side via the passage holes.

3. Functional component according to claim 1, wherein, in a plugged-in position, the plug-in domes project out of the passage holes of the outer stamped parts and bear against the outer sides of the outer stamped parts, which are remote from the middle stamped part, by way of a flat head which is wider than the dimension of the passage holes.

* * * * *